(12) United States Patent
Herb et al.

(10) Patent No.: US 6,575,680 B2
(45) Date of Patent: Jun. 10, 2003

(54) FASTENING DEVICES

(75) Inventors: Armin Herb, Apfeldorf (DE); Armin Hoffman, Landsberg (DE); Stefan Unverzagt, Penzing (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 10/057,361

(22) Filed: Oct. 23, 2001

(65) Prior Publication Data

US 2002/0110435 A1 Aug. 15, 2002

(30) Foreign Application Priority Data

Oct. 23, 2000 (DE) .......................................... 100 52 534
Sep. 5, 2001 (EP) ............................................. 01121242

(51) Int. Cl.$^7$ ................................................. F16B 27/00
(52) U.S. Cl. ........................................ 411/84; 411/427
(58) Field of Search .......................... 411/84, 85, 103, 411/104, 427

(56) References Cited

U.S. PATENT DOCUMENTS 5,022,804 A * 6/1991 Peterson ..................... 411/104
5,209,619 A * 5/1993 Rinderer ..................... 411/85
5,489,173 A * 2/1996 Hofle ........................... 411/85
5,628,598 A * 5/1997 Hofle ........................... 411/85

FOREIGN PATENT DOCUMENTS

FR  2636687  12/1990
WO  9836180  8/1998

* cited by examiner

Primary Examiner—Flemming Saether
Assistant Examiner—Jori Schiffman
(74) Attorney, Agent, or Firm—Sidley Austin Brown & Wood, LLP

(57) ABSTRACT

A fastening device for securing tubes, pipes and the like is formed of a mounting rail (3) having a C-shaped cross-section and an elongated space (2) and a retaining plate (1). The retaining plate (1) has a tapped through hole running transverse to the elongated space (2), the tapped hole has an internal thread for form-locking reception of a fastening element. Further, the retaining plate (1) has on the side (13) facing inwardly from the elongated space (2), at least one web facilitating rigidity and positioning, in order to provide a manageable and economical fastening device with high load capacities (P).

8 Claims, 2 Drawing Sheets

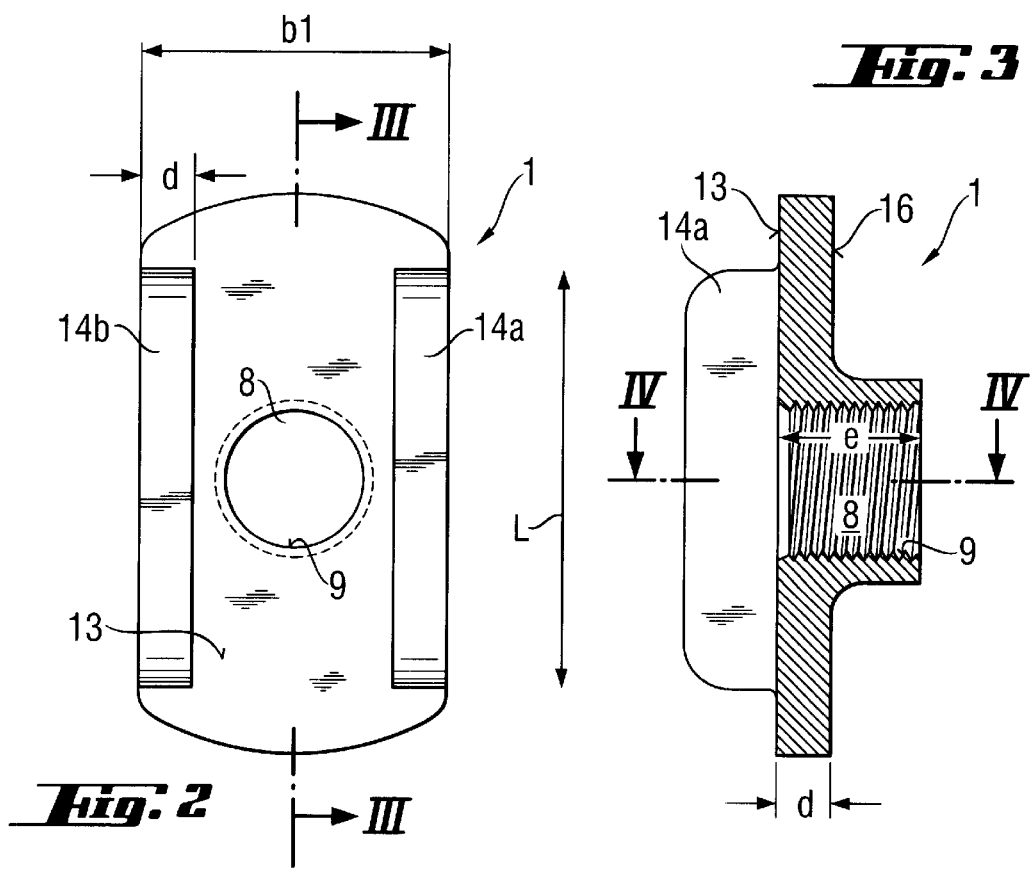
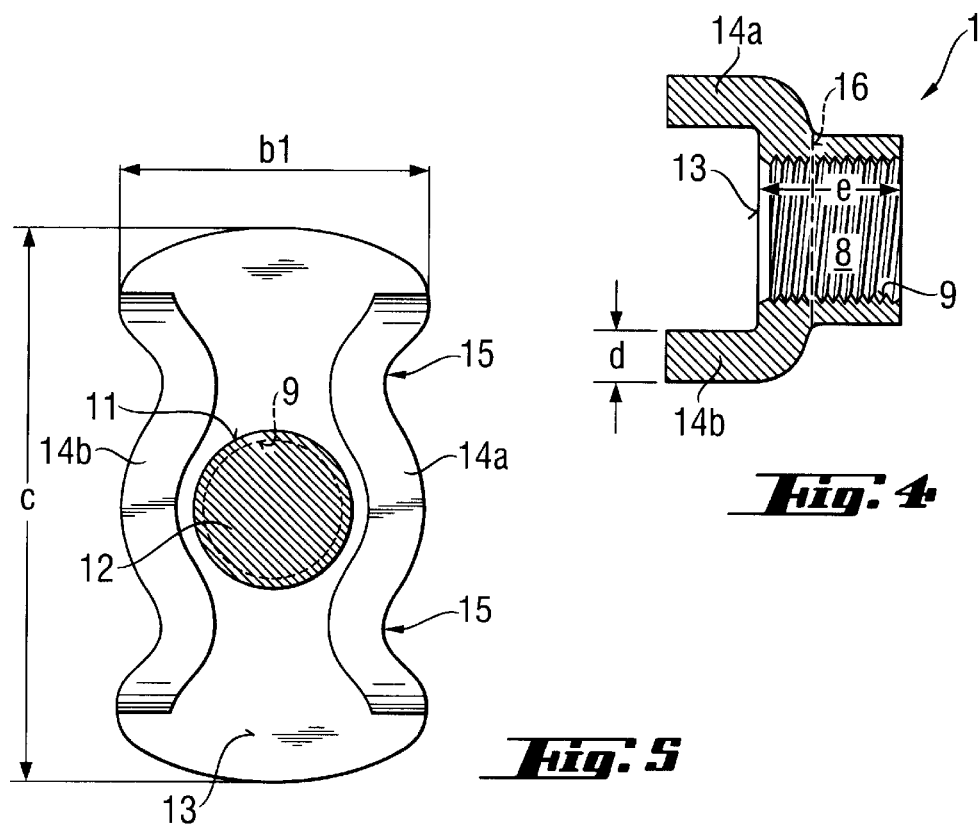

FASTENING DEVICES

BACKGROUND OF THE INVENTION

The invention relates to fastening devices for affixing tubes, pipes and similar objects to an elongated mounting rail having a C-shaped cross-section transversely of the elongated direction and a elongated space, and a retaining plate. The plate has an internally threaded hole passing through it and running transverse to the plane of the plate, whereby the retaining plate has a width running parallel to the plane of the plate, the width corresponding at most to the width of the elongated space and perpendicular thereto has a length running parallel to the plane of the plate that is greater than the width of the opening.

Fastening devices of the aforedescribed type are utilized particularly in hanging or bracing of objects, such as tubes pipes and similar objects. A mounting rail having a elongated space is fastened to a base or to a structural component, for example, using a plurality of segmental anchors. For fixing a fastening element to the mounting rail a retaining plate is introduced through the elongated space into the internal space of the hollow mounting rail and rotated through an angle, for example 90°, so that the retaining plate grips around the free ends of the so-called retaining projections. The retaining plate secures the fastening device, for example a threaded pin, with a hole passing through it having an internal thread, the pin engaging at least partially an external section arranged at the fastening device. To provide insertion of the retaining plate into the elongated space the width of the retaining plate corresponds at most to the width of the elongated space and, since the length extending transversely relative to the width of the retaining plate is greater than the width of the space, a gripping of the retaining projections of the mounting rail by the retaining plate is made possible by deviation of the retaining plate inserted into the internal space.

A fastening device comprised of a C-shaped mounting rail and a cornered retaining piece is well-known from the generally known prior art, for example, DE 3811974 C2. The retaining piece is embodied, for example, as a cast piece.

The disadvantage in the generally well-known solution is that the production of the retaining pieces to such dimensions necessarily consumes a relatively large amount of material which is unsuitable if the fastening means is to be economically produced.

Further, the solid construction of the retaining plate negatively affects the overall weight of the fastening device- especially if a plurality of retaining plates are used.

SUMMARY OF THE INVENTION

The object of the present invention is to provide a fastening device comprised of a mounting rail and a retaining plate that can be economically produced and is light in weight and, further, provides high stability.

According to the invention, the object is achieved in that the retaining plate on the side facing away from the elongated space, has at least one web that provides for rigidity and positioning.

The retaining plate can be made in a fashion that conserves material and provides for light-weight, so that on the side of the retaining plate facing away from the elongated space of the mounting rail at least one web is arranged, the web providing for rigidity and positioning of the retaining plate. In addition, the web(s) provide(s) also the opportunity of securing the positioning of a fastening device that may be used. In other words, for example, a space extending axially to the internal hole is provided by the web that serves in receiving, in part, the fastening device. Thus, it is possible to use the fastening device without the necessity of cutting to precise length.

Preferably, in order to provide adequate stability of the retaining plate, two webs are provided that run parallel to one another. The webs can each exhibit, depending on the requirements, different cross-sections, such as for example, rounded, rectangular or the like. As regards the dimensions of the webs, the general conditions relevant to the fastening device must be considered.

The webs are advantageously arranged on both sides of the internal thread in order to assure optimum stability especially in the region of the internal thread, since the internal thread produces an attenuation or weakening of the retaining plate.

Preferably, the cross-section of the retaining plate in the region of the webs is designed U-shaped, whereby the free ends form the webs. This embodiment represents the optimum with respect to material consumption and economies.

The webs advantageously form, at least on one side of the internal thread, a reinforcement to prevent overload in the area of the internal thread. For fastening devices whose loading capacity is of primary concern, the webs can be embodied, for example, with a corrugated form over the entire length in order to enhance its stability. In any event, the reinforcement fulfills the function of a flexure point in order to safeguard the mounting rail and consequently the fastening device from overload.

In order to assure economic means for production, the retaining plate preferably has a uniform wall thickness.

Advantageously, the side of the retaining plate facing the elongated space overlaps, at least in the area of the internal thread, the remaining area of the side facing the elongated space, so that on the one hand there is sufficient axial extent of the internal thread and on the other hand the height of the web extending axially to the internal thread is minimized.

The axial extension of the internal thread corresponds advantageously to approximately 1.5 to 4.5 times, preferably 2.25 times, the wall thickness of the retaining plate.

In order to assure economic production of the fastening device, the mounting piece is embodied advantageously as a die-cut and bent piece.

BREIF DESCRIPTION OF THE INVENTION

The invention is more completely explained in the following read together with the exemplary embodiment, wherein:

FIG. 2 represents a top view of the retaining plate shown in FIG. 1;

FIG. 3 represents a section III–III of the retaining plate shown in FIG. 2;

FIG. 4 represents a cross-section IV–IV of the retaining plate illustrated in FIG. 3; and FIG. 5 represents a top view of a further retaining plate with reinforcing corrugations.

DETAILED DESCRIPTION OF THE INVENTION

Figure 1:
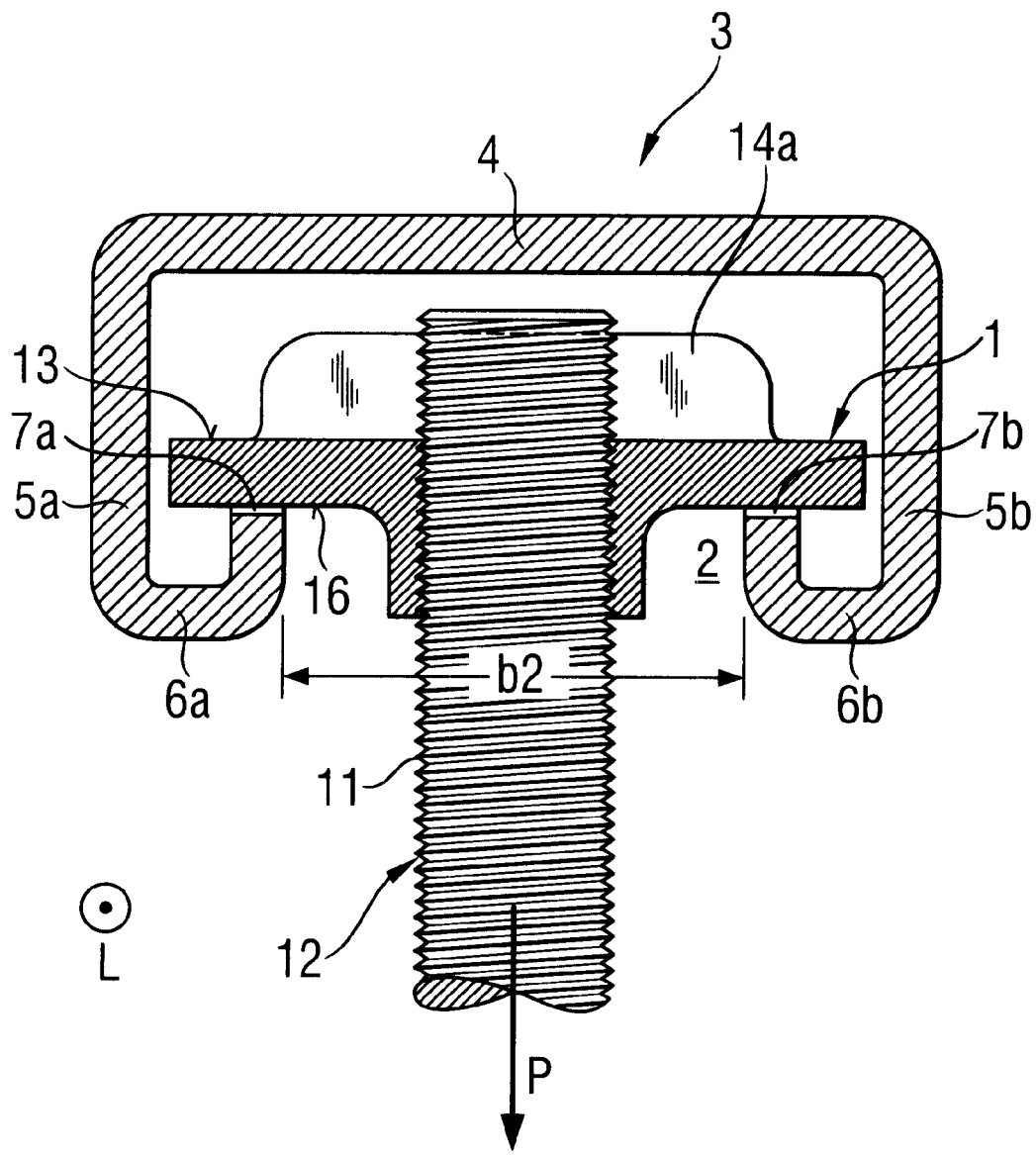
FIG. 1 represents a cross-section through the fastening device with a retaining plate represented in transaction section.

FIGS. 1 to 4 represent a fastening device according to the invention having an elongated hollow mounting rail 3 with a transverse C-shaped cross section having elongated space 2 and a retaining plate 1.

The retaining plate 1 has a tapped through hole 8 passing through it running transverse to the plane of the plate, the through hole has an internal thread 9 as is illustrated particularly in FIGS. 2 to 4. The tapped through hole 8 serves for receiving an element to be fastened, in particular one with a bolt 12 having an external thread 11 as is illustrated in FIG. 1 and in FIG. 5. The retaining plate 1 has a width b1 running parallel to the plane of the plate, corresponding approximately to the width b2 of the elongated space 2 and has a length c perpendicular thereto running parallel to the plane of the plate, the length being greater than the width b2 of the elongated space 2. The retaining plate 1 moreover exhibits a uniform wall thickness.

The retaining plate 1 has a tapped through hole 8 passing through it running transverse to the plane of the plate, the through hole has an internal thread 9 as is illustrated particularly in FIGS. 2 to 4. The tapped through hole 8 serves for receiving an element to be fastening, in particular one with a bolt 12 having an external thread 11 as is illustrated in FIG. 1 and in FIG. 5. The retaining plate 1 has exhibits a width b1 running parallel to the plane of the plate, corresponding approximately to the width b2 of the elongated space 2 and has a length c perpendicular thereto running parallel to the plane of the plate, the length being greater than the width b2 of the elongated space 2. The retaining plate 1 moreover exhibits a uniform wall thickness.

The U-shaped cross-sectional retaining plate 1 has on the side 13 facing inwardly from the elongated space 2, two webs 14a, 14b serving as reinforcement and for positioning, the webs forming the free legs in cross-section (shown particularly in FIG. 4). The webs 14a, 14b are embodied as perpendicular to the side 13 facing inwardly from the elongated space 2 running in the longitudinal direction of the retaining plate 1.

The side 16 of the retaining plate 1 facing into the elongated space 2 overlaps in the region of the internal thread 9, the remaining area of the side 16, as is particularly revealed in FIGS. 3 and 4. The axial extent e of the internal thread 9 corresponds approximately to 2.25 times the wall thickness d. The retaining plate 1 is, for example, formed as a die-cut and bent piece.

The embodiment represented in FIG. 5 shows at the webs 14a, 14b additionally two reinforcing corrugations 15 adjacent the internal thread 9. The reinforcements 15 serve on the one hand to stabilize the internal thread 9 and on the other hand as an overload protection for the fastening device. If excessive load P is applied to the fastening device, particularly at the bolt 12, a collapse of the retaining plate 1 results in the region of the reinforcing corrugations 15. The overload protection prevents the entire fastening means from failing in the event of application of an excessively high load P.

What is claimed is:

1. A fastening device for affixing pipes objects comprising an elongated hollow mounting rail (3) having a C-shaped cross section transversely of the elongated direction with an elongated space (2) extending in the elongated direction thereof and open into the hollow mounting rail and a planar retaining plate (1) insertable into said mounting rail through said space (2), said plate having a tapped through hole (8) with an internal thread (9) extending transversely of the planar surface of said plate (1), said plate has a width (b1) corresponding at most to a width (b2) of said space (2) extending transversely of the elongated direction thereof and a length (c) perpendicular of said width (b1) and greater than the width (b2) of said space (2), and said plate (1) having a side (13) facing into said mounting rail (3) with at least one web (14a, 14b) extending transversely inwardly of said side (13) for reinforcing and positioning said plate, said at least one web extending in the length (c) direction of said plate and a reinforcing corrugations (15) in said at least one side web on at least one side of said hole.

2. A fastening device, as set forth in claim 1, wherein said side (13) has two said webs (14a, 14b) arranged each on an opposite side of said hole (8).

3. A fastening device, as set forth in claim 2, wherein said plate (1) in a region of said webs (14a, 14b) has a U-shaped section extending transversely of the length (c) of said plate.

4. A fastening device, as set forth in claim 1, wherein said plate (1) has a uniform wall thickness (d).

5. A fastening device, as set forth in claim 1, wherein said plate (1) facing outwardly of said space (2) has an extension of said hole (8) extending outwardly from said plate (1).

6. A fastening device, as set forth in claim 5, wherein the axial extension of said hole (8) corresponds approximately to 1.5 to 4.5 times said uniform wall thickness (d) of said plate (1).

7. A fastening device, as set forth in claim 5, wherein said plate (1) comprises a stamped bent piece.

8. A fastening device, as set forth in claim 1, wherein said reinforcing corrugation (15) comprises with at least two said reinforcing corrugations (15) extending inwardly toward and spaced laterally on opposite sides of said through hole (8).

* * * * *